United States Patent
Smallcomb

(10) Patent No.: US 7,269,125 B2
(45) Date of Patent: Sep. 11, 2007

(54) METHOD AND APPARATUS FOR TIMING RECOVERY IN AN OFDM SYSTEM

(75) Inventor: Joseph Smallcomb, Lake Worth, FL (US)

(73) Assignee: XM Satellite Radio, Inc., Washington, DC (US)

( * ) Notice: Subject to any disclaimer, the term of this patent is extended or adjusted under 35 U.S.C. 154(b) by 971 days.

(21) Appl. No.: 10/036,870

(22) Filed: Dec. 26, 2001

(65) Prior Publication Data

US 2003/0117940 A1    Jun. 26, 2003

(51) Int. Cl.
H04J 11/00    (2006.01)
H04L 7/00    (2006.01)

(52) U.S. Cl. .................... 370/208; 370/503; 375/355

(58) Field of Classification Search ................ None
See application file for complete search history.

(56) References Cited

U.S. PATENT DOCUMENTS

| | | | | |
|---|---|---|---|---|
| 5,602,835 A * | 2/1997 | Seki et al. | ............... | 370/206 |
| 5,608,764 A * | 3/1997 | Sugita et al. | ............... | 375/344 |
| 5,694,389 A * | 12/1997 | Seki et al. | ............... | 370/208 |
| 5,787,123 A * | 7/1998 | Okada et al. | ............... | 370/203 |
| 5,848,107 A * | 12/1998 | Philips | ............... | 375/342 |
| 6,091,702 A | 7/2000 | Saiki | | |
| 6,125,124 A | 9/2000 | Junell et al. | | |
| 6,134,267 A | 10/2000 | Schäfer et al. | | |
| 6,314,083 B1 * | 11/2001 | Kishimoto et al. | ......... | 370/210 |
| 6,434,205 B1 * | 8/2002 | Taura et al. | ............... | 375/355 |
| 6,501,810 B1 * | 12/2002 | Karim et al. | ............... | 375/354 |
| 6,591,092 B1 * | 7/2003 | Tsuruoka | ............... | 375/316 |
| 6,611,493 B1 * | 8/2003 | Miyashita et al. | ......... | 370/208 |
| 6,744,828 B1 * | 6/2004 | Uchiyama et al. | ......... | 375/326 |
| 6,930,995 B1 * | 8/2005 | Heinonen et al. | ......... | 370/350 |

* cited by examiner

Primary Examiner—Steven Nguyen
(74) Attorney, Agent, or Firm—Pablo Meles; Akerman Senterfitt

(57) ABSTRACT

A method (500) for timing recovery in an orthogonal frequency division multiplexing (OFDM) system includes the steps of detecting (502) a lack of a synchronization symbol and determining (504) a timing offset from calculating the average group delay across the subcarriers over multiple OFDM symbols. The timing offset is fed back (506) to a demodulator and the symbol timing is adjusted (508) based on the Average Group Delay phasor fed back to the demodulator.

11 Claims, 4 Drawing Sheets

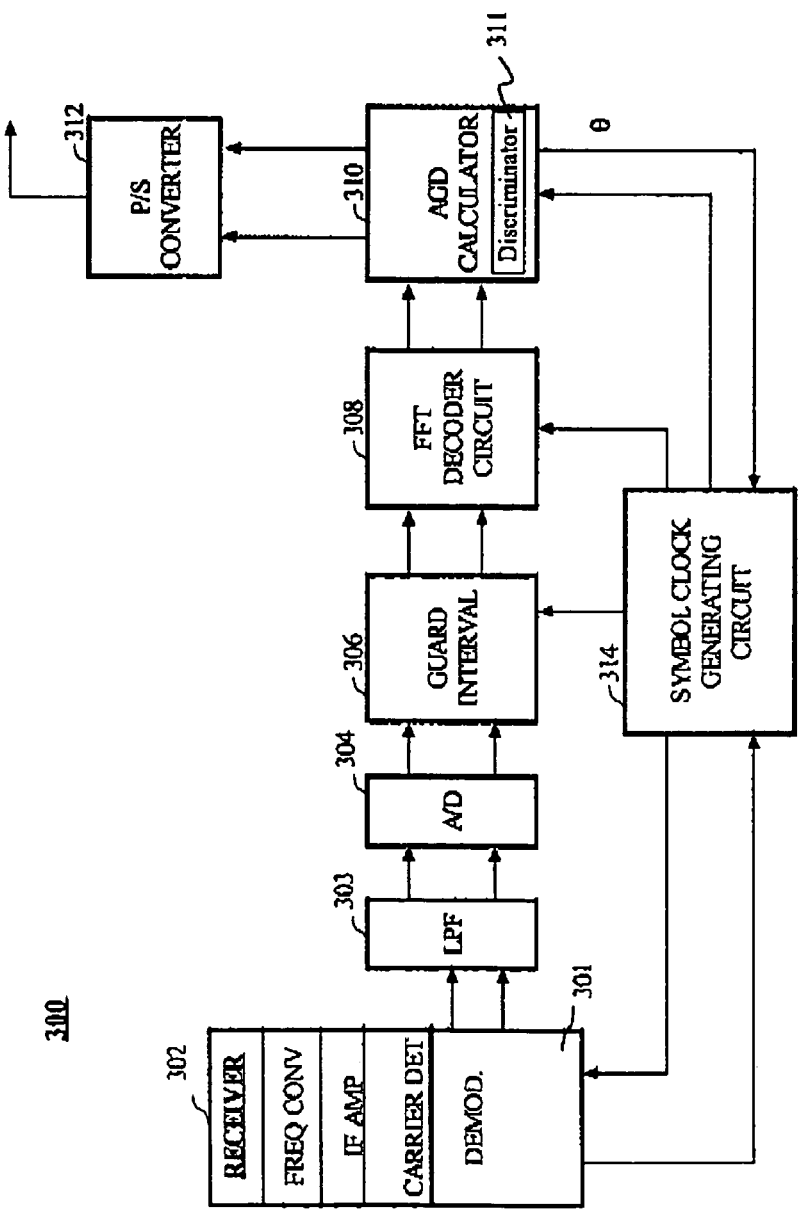

METHOD AND APPARATUS FOR TIMING RECOVERY IN AN OFDM SYSTEM

CROSS-REFERENCE TO RELATED APPLICATIONS not applicable

FIELD OF THE INVENTION

The invention relates generally to a method and apparatus for recovering symbol timing, and more particularly to a method and apparatus for recovering symbol timing using an Average Group Delay of OFDM symbol subcarriers.

BACKGROUND OF THE INVENTION

Satellite radio operators will soon provide digital quality radio broadcast services covering the entire continental United States. These services will offer approximately 100 channels, of which nearly 50 channels in a typical configuration will provide music with the remaining stations offering news, sports, talk and data channels. Digital radio may also be available in limited markets within the United States in the near future from a company that will provide a terrestrial based system using FM subcarrier signals. In Europe, Eureka 147 is the standard for Digital Audio Broadcasting (DAB). It utilizes terrestrial based stations to broadcast digital audio and data to mobile and stationary radios. The European standard expands RF coverage by offering Single Frequency Network (SFN) configurations and implementing Orthogonal Frequency Division Multiplexing (OFDM) modulation to mitigate the vagaries of Raleigh fading.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electromagnetic spectrum for satellite digital broadcasting, 12.5 MHz of which are owned by the assignee of the present application "XM Satellite Radio Inc." and 12.5 MHz of which are owned by another entity.

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation of multipath interference and addresses reception issues associated with blockage of the satellite signals. In accordance with XM Satellite Radio's unique scheme, the 12.5 MHZ band will be split into 6 slots. Four slots will be used for satellite transmission. The remaining two slots will be used for terrestrial reinforcement.

In accordance with the XM frequency plan, each of two geostationary Hughes 702 satellites will transmit identical or at least similar program content. The signals transmitted with QPSK modulation from each satellite (hereinafter satellite 1 and satellite 2) will be time interleaved to lower the short-term time correlation and to maximize the robustness of the signal. For reliable reception, the LOS signals transmitted from satellite 1 are received, reformatted to Multi-Carrier Modulation (MCM) and rebroadcast by terrestrial repeaters. The assigned 12.5 MHZ bandwidth (hereinafter the "XM" band) is partitioned into two equal ensembles or program groups A and B. The use of two ensembles allows 4096 Mbits/s of total user data to be distributed across the available bandwidth. Each ensemble will be transmitted by each satellite on a separate radio frequency (RF) carrier. Each RF carrier supports up to 50 channels of music or data in Time Division Multiplex (TDM) format. With terrestrial repeaters transmitting an A and a B signal, six total slots are provided, each slot being centered at a different RF carrier frequency.

Referring to FIG. 1, satellite radio operators will soon provide digital radio service to the continental United States. Briefly, the service provided by XM Satellite Radio includes a satellite X-band uplink 11 to two satellites (12 and 14) which provide frequency translation to the S-band for re-transmission to radio receivers (20, 22, 24, and 26) on earth within the coverage area 13. The satellites provide for interleaving and spatial diversity. Radio frequency carriers from one of the satellites are also received by terrestrial repeaters (16 and 18). The content received at the repeaters are also "repeated" at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites 12 and 14 and the repeaters are received by SDARS receivers 20-26. The receivers 20-26 may be located in automobiles, handheld or stationary units for home or office use. The SDARS receivers 20-26 are designed to receive one or both of the satellite signals and the signals from the terrestrial repeaters and combine or select one of the signals as the receiver output.

Current symbol timing recovery for the XM digital audio radio system is based on Amplitude Modulated Synchronization Symbol (AMSS). AMSS can become highly corrupted with high delay spreads and/or when a vehicle is stopping or is stopped. In extreme conditions, no AMSS are detected, leaving the Multi-Carrier Modulation (MCM) demodulator to drift out of lock. In another instance, the channel can have delayed signal(s) that are stronger than the earlier arriving signal. The current AMSS algorithm tends to lock onto the strongest signal rather than the desired earliest signal, causing severe intersymbol interference. Thus, a method and apparatus is needed to provide reliable symbol timing in conditions where current OFDM symbol synchronization is susceptible to corruption or intersymbol interference.

SUMMARY OF THE INVENTION

In a first aspect of the present invention, a method for timing recovery in an orthogonal frequency division multiplexing (OFDM) system comprises the steps of detecting a lack of a synchronization symbol, determining a timing offset from the Average Group Delay (AGD) of OFDM subcarrier and feeding back the offset to a demodulator. The symbol timing is adjusted based on the timing offset fed back to the demodulator.

In a second aspect of the present invention, a method for timing recovery in an orthogonal frequency division multiplexing (OFDM) system comprises detecting a negative AGD from the OFDM symbols, narrowing a search window for the synchronization symbol and adjusting the timing to an earlier arriving signal detected by a synchronization symbol recovery detector.

In a third aspect of the present invention, a method for timing recovery in an orthogonal frequency division multiplexing (OFDM) system, comprises the steps of detecting a negative AGD, disabling a synchronization symbol recovery algorithm, and adjusting the phase until a non-negative AGD is detected.

Finally, in a fourth aspect of the present invention, a digital receiver unit comprises a receiver, an orthogonal frequency division multiplexing demodulator and a processor coupled to the receiver and the demodulator. The processor is preferably programmed to detect a lack of a synchronization symbol, determine a timing offset from the AGD of the OFDM sub carriers, feed back the timing offset to the demodulator, and adjust the symbol timing based on the this timing offset fed back to the demodulator.

BRIEF DESCRIPTION OF THE DRAWINGS

FIG. 3 is a block diagram of a receiver for an OFDM signal in accordance with the present invention.

FIGS. 4 and 4a are phase diagram illustrating the differential decoding X(n) and the data removal Y(n) respectively in accordance with the present invention.

DETAILED DESCRIPTION OF THE DRAWINGS

Figure 1:
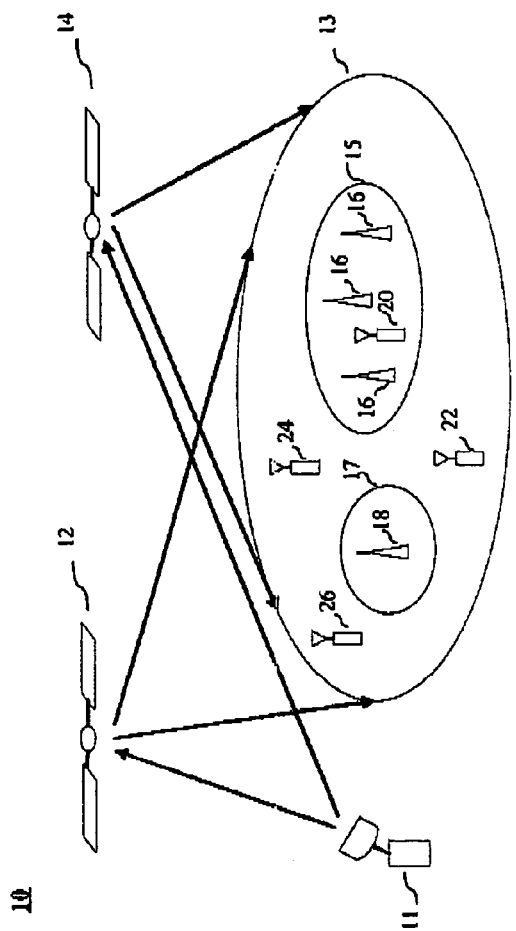
FIG. 1 illustrates a satellite digital audio radio service system architecture in accordance with the present invention.

Referring to FIG. 1, satellite radio operators will soon provide digital radio service to the continental United States. Briefly, the service provided by XM Satellite Radio includes a satellite X-band uplink 11 to two satellites (12 and 14) which provide frequency translation to the S-band for re-transmission to radio receivers (20, 22, 24, 26 and 28) on earth within the coverage area 13. The satellites provide for interleaving and spatial diversity. Radio frequency carriers from one of the satellites are also received by terrestrial repeaters (16 and 18). The content received at the repeaters are also "repeated" at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites 12 and 14 and the repeaters are received by SDARS receivers 20-28. As depicted in FIG. 1, the receivers 20-28 may be located in vehicles (such as automobiles, trucks, and boats), handheld or stationary units for home or office use. The SDARS receivers 20-28 are designed to receive one or both of the satellite signals and the signals from the terrestrial repeaters and combine or select one of the signals as the receiver output.

Figure 2:
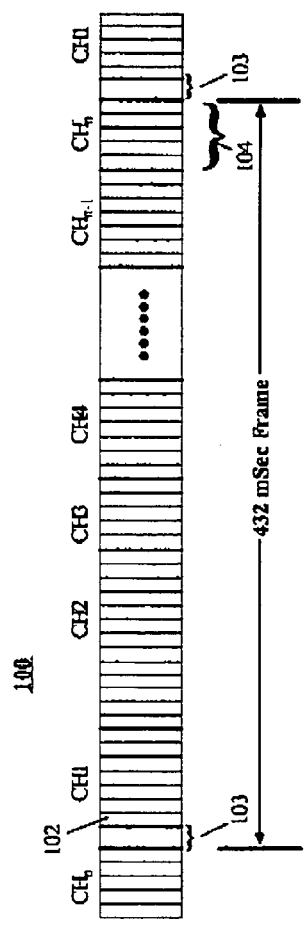
FIG. 2 is a diagram illustrating a representative bit stream in a frame format for distributing data in accordance with the present invention.

Referring to FIG. 2, a plurality of communication resource channels (Channel 1 through 100) are shown in accordance with the present invention. In this instance, the over-the-air protocol frame format 100 of the XM Satellite Radio system is shown. This frame format 100 is based on a 432 millisecond frame as shown in FIG. 2 where each frame is subdivided into 8 kilobit per second sub-channels 102. These sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 100. It should be noted that each receiver in the XM Satellite System has a unique identifier allowing for the capability of individually addressing each receiver over-the-air to enable or disable services or to provide custom applications such as individual data services or group data services.

FIG. 3 shows a receiver unit 300 for an OFDM signal. The receiver unit 300 of FIG. 3 is able to accept an RF OFDM signal emitted from an OFDM transmitter. The receiver unit 300 includes a receiver 302 having an antenna (not shown) which catches an RF OFDM signal sent from, for example, an OFDM transmitter via a spatial transmission line (the air.) The central frequency of the RF OFDM signal is a predetermined frequency in the MHz range, for example 100 MHz. The RF OFDM signal has multiple RF orthogonal carriers that are modulated in accordance with transmitted baseband signals respectively. The receiver 302 preferably includes an RF amplifier (not shown) which enlarges the caught RF OFDM signal. The receiver 302 could also include a frequency converter (not shown) to convert the received OFDM signal into a corresponding IF OFDM signal. The IF OFDM signal may have multiple IF orthogonal carriers that are modulated in accordance with transmitted baseband signals respectively. The frequency converter could include a local oscillator and a mixer. In the frequency converter, the RF OFDM signal and the output signal of the local oscillator are mixed by the mixer so that the RF OFDM signal is converted into the IF OFDM signal.

The IF OFDM signal is fed from the frequency converter to an IF amplifier and the output from the IF amplifier is fed to a quadrature demodulator (or OFDM Demodulator 301) and a carrier detecting circuit.

The carrier detecting circuit includes a PLL (Phase locked loop) circuit having a combination of a phase comparator (a multiplier), an LPF, a VCO (Voltage-controlled oscillator), and a ¼ frequency divider. The PLL circuit recovers the carriers in the IF OFDM signal. An output signal of the carrier detecting circuit, which corresponds to the recovered carriers, is fed to a local oscillator. The local oscillator outputs a signal corresponding to the extracted central-frequency carrier. Thus, the local oscillator reproduces a local oscillator signal used in a transmitter.

The IF OFDM signal (or the RF OFDM signal) is based on the carriers with frequencies which are spaced at equal intervals. The frequencies of the carriers neighboring the central carrier are spaced from the frequency of the central carrier by only a small frequency interval. Accordingly, it is preferable that the extraction of the central carrier is implemented by a high-selectivity circuit.

The local oscillator preferably uses a high-selectivity circuit. Specifically, the local oscillator includes a PLL circuit for extracting the central carrier from the carriers outputted by the carrier detecting circuit. A VCO in the PLL circuit in the local oscillator uses a voltage controlled crystal oscillator (VCXO) which can oscillate at a frequency variable in a given small range (for example plus or minus 200 Hertz) around the frequency of the central carrier. In addition, an LPF in the PLL circuit has a cutoff frequency adequately low with respect to the frequency intervals between the carriers.

The output signal of the local oscillator is fed to the quadrature demodulator 301 of the receiver 302. The output signal of the local oscillator is also fed to a 90 degrees phase shifter that shifts the phase of the output signal of the local oscillator by 90 degrees. The phase shift resultant signal is outputted to the quadrature demodulator 301 so that a pair of reproduced local oscillator signals having a quadrature relation are fed to the quadrature demodulator. In response to the quadrature signals, the IF OFDM signal is demodulated by the quadrature demodulator 301 into baseband signals corresponding to a real part and an imaginary part (an in-phase signal and a quadrature signal, that is, an I signal and a Q signal) respectively.

Output signals from the quadrature demodulator are fed to an LPF 303. Only components of the output signals of the quadrature demodulator, which occupy a desired frequency band, are passed through the LPF 303. Output signals of the LPF 303 which have analog forms are fed to an A/D converter 304. The output signals of the LPF 303 are subjected to sampling processes by the A/D converter 304, and are converted by the A/D converter 304 into corresponding digital signals. The AID converter 304 operates in response to a sample clock signal (a sample sync signal) fed from a sample clock signal generating circuit in the symbol clock generating circuit 314.

One of the output signals of the quadrature demodulator is fed to the sample clock signal generating circuit. The output signal of the local oscillator is fed to the sample clock signal generating circuit. The sample clock signal generating circuit may include a PLL circuit for generating a signal phase-locked with respect to a pilot signal in the output signal of the quadrature demodulator. It should be noted that the pilot signal is carried by the first specified carrier as a continuous signal during every 1-symbol interval containing a guard interval. The sample clock signal generating circuit derives pilot signal frequency information, and reproduces the pilot signal.

In a transmitter, the frequency of the pilot signal is set to correspond to a given ratio between integers with respect to the frequency of the sample clock signal. The sample clock signal generating circuit includes a frequency multiplier operating on the reproduced pilot signals at a multiplying factor corresponding to the above-indicated frequency ratio. The sample clock signal generating circuit recovers the sample clock signal (the sample sync signal) through the frequency multiplication.

The output signals of the A/D converter 304 are fed to a guard interval processing circuit 306. The guard interval processing circuit 306 extracts time-portions of the output signals of the A/D converter 304 which occupy every effective symbol interval. The guard interval processing circuit 306 operates in response to a clock signal fed from a clock signal generating circuit within the symbol clock generating circuit 314. Output signals of the guard interval processing circuit 306 are fed to an FFT (fast Fourier transform) decoding circuit 308.

The FFT decoding circuit 308 subjects the output signals of the guard interval processing circuit 306 to processing which corresponds to complex fast Fourier transform. The FFT decoding circuit 308 operates in response to a clock signal fed from the clock signal generating circuit within the symbol clock generating circuit 314. According to the complex fast Fourier transform processing, the FFT decoding circuit 308 derives the levels of baseband carrier in the real-part signal and the imaginary-part signal outputted from the guard interval processing circuit 306. In the FFT decoding circuit 308, the derived real-part levels and the derived imaginary-part levels are compared with reference demodulation output levels so that the states of transmitted digital signals are determined. In this way, the transmitted digital information is recovered.

Output signals of the FFT decoding circuit 308 which correspond to the recovered digital signals are fed to an Average Group Delay (AGD) calculator 310. The AGD calculator 310 either alone or in combination with other elements preferably operates as a processor that detects a lack of a synchronization symbol and determines a time offset from a set of OFDM symbols which is fed back to the OFDM demodulator 301. The symbol timing is adjusted based on the AGD and fed back to the demodulator.

The AGD calculator may also correct errors in the ourput signals of the FFT decoding circuit 310 in response to the phase error signals contained therein. The AGD calculator uses a phasor to estimate the average delay of a multi-carrier modulation symbol. The AGD calculator 310 translates the phasor to a timing offset and feeds back the timing offset back to the symbol clock generating circuit 314 which in turn feeds the timing offset back to the demodulator 301 in receiver 302. It should be noted that the timimg offset can be directly determined from the OEDM symbols using a discriminator 311 in the feedback loop. The AGD calculator 310 is followed by a parallel-to-serial (P/S) convener 312. The output signals of the AGD calcalator 310 (that is, the error-correction-resultant signals) are subjected by the P/S converter 312 to parallel-to-serial (P/S) conversion, being thereby rearranged and combined into a serial-form digital signal. The P/S converter 312 operates in response to a clock signal fed from a clock signal generating circuit in the symbol clock generating circuit 314. The serial-form digital signal is transmitted from the P/S convener 312 to an external device (not shown).

One of the output signals of the quadrature demodulator in the receiver 302 is fed to the symbol clock signal generating circuit 314. The sample clock signal is fed from the sample clock signal generating circuit to the symbol clock signal generating circuit 314. The symbol clock signal generating circuit 314 detects the boundaries between guard interval and effective symbol intervals in response to the output signal of the quadrature demodulator in the receiver 302. The symbol clock signal generating circuit 314 divides the frequency of the sample clock signal in response to information of the detected boundaries between guard intervals and effective symbol intervals, thereby generating or reproducing a symbol clock signal (a symbol sync signal).

The clock signal generating circuit receives the sample clock signal from the sample clock signal generating circuit within the symbol clock generating circuit 314. The clock signal generating circuit receives the symbol clock signal from the symbol clock signal generating circuit 314. The clock signal generating circuit produces clock signals in response to the output signals of the sample clock signal generating circuit and the symbol clock signal generating circuit 314. The clock signal generating circuit feeds the produced clock signals to the guard interval processing circuit 306, the FFT decoding circuit 308, and the AGG calculator 310 as operation timing control signals.

As previously explained, a signal transmitted during each guard interval is a copy of a portion of the signal transmitted during an effective symbol interval immediately following the guard interval. The waveforms of most of the carriers are discontinuous at the boundaries between guard intervals and effective symbol intervals, that is, at the starting points of effective symbol intervals. The discontinuous waveforms are rich in high frequency components. The symbol clock signal generating circuit 314 senses high frequency components of the output signal of the quadrature demodulator. The symbol clock signal generating circuit 314 detects the starting points of effective symbol intervals in response to the sensed high-frequency signal components. The symbol clock signal generating circuit 314 converts the sample clock signal into the reproduced symbol clock signal in response to the detected starting points of effective symbol intervals. The reproduced symbol clock signal is locked in phase with effective symbol intervals. The reproduced symbol clock signal accurately represents the starting points of effective symbol intervals.

Figure 5:
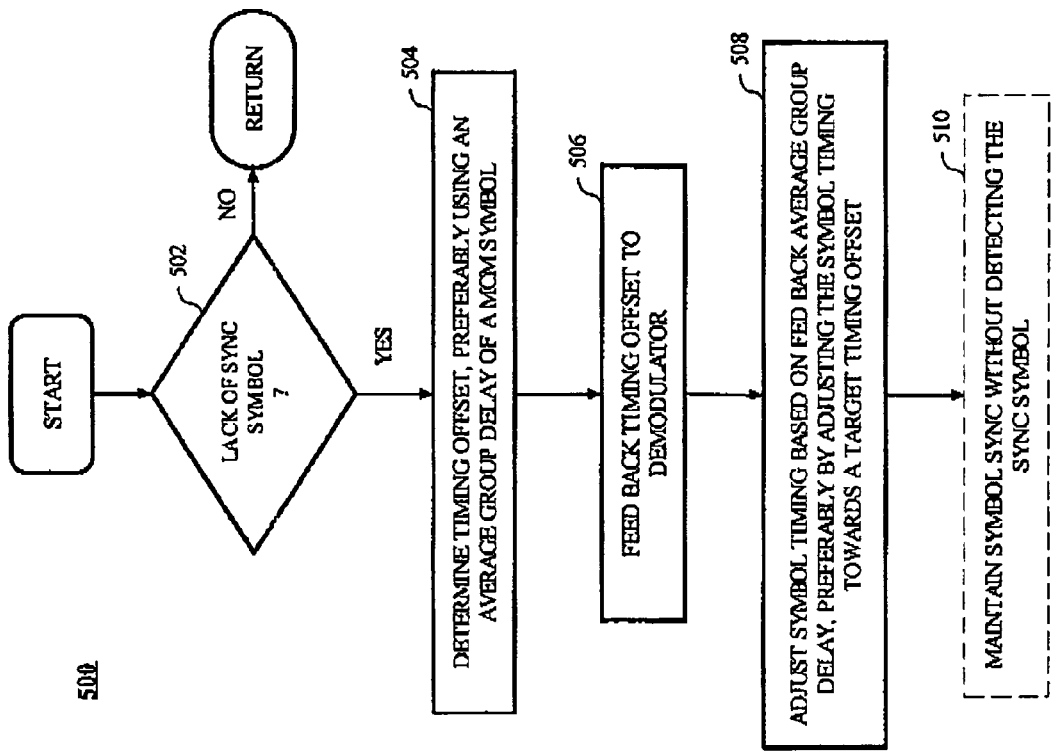
FIG. 5 is a flowchart illustrating a method for timing recovery in accordance with the present invention.

A flow chart illustrating a method 500 for timing recovery in an orthogonal frequency division multiplexing (OFDM) system is shown in FIG. 5. If a lack of a synchronization symbol is detected at decision block 502, then a timing offset is determined from a set of OFDM symbols at block 504 preferably using a phasor to estimate the average group delay of a multi-carrier modulation symbol. The phasor is generated by a) computing the differential phasor between each pair of adjacent OFDM subcarriers (X(n)), b)remove the QPSK data by rotating the differential phasor to the first quadrant (Y(n)), and c) computing the average ($\theta$). The output of the FFT decoder circuit 308 of FIG. 3 represents the QSPK subcarriers Sn. The differential phasor or differential decoding can be represented by the following: $Xn=Sn-CONJ(S_{n-1})$.

The removal of the QPSK data by rotating the differential phasor to the first quadrant can be represented by:

$$Yn=Xn* \text{Sin}[\text{Real}(Xn)]-j\,\text{Sin}[\text{Imag}(Xn)].$$

The average ($\theta$) can be computed as follows: $\theta=\text{Avg}[\Sigma\,Yn]$.

The angle of the phasor is an estimate of the Average Group Delay (AGD) and is directly proportional to the timing offset. This timing offset is preferably fed back to a demodulator and the symbol timing is adjusted based on the timing offset fed back to the demodulator. Preferably, the symbol timing is adjusted towards a target timing offset. By using the phasor, the symbol synchronization can be maintained without even detecting the synchronization symbol as shown in step 510.

Figure 6:
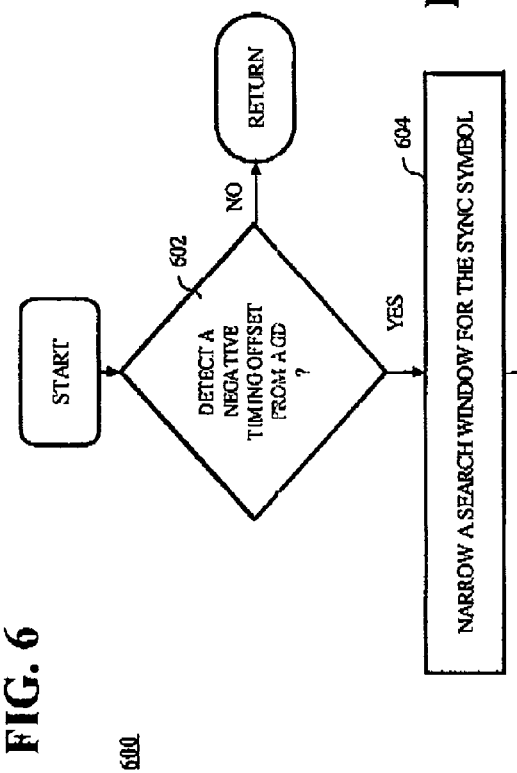
FIG. 6 is a flowchart illustrating a method for avoiding inter-symbol interference in accordance with the present invention.
Figure 7:
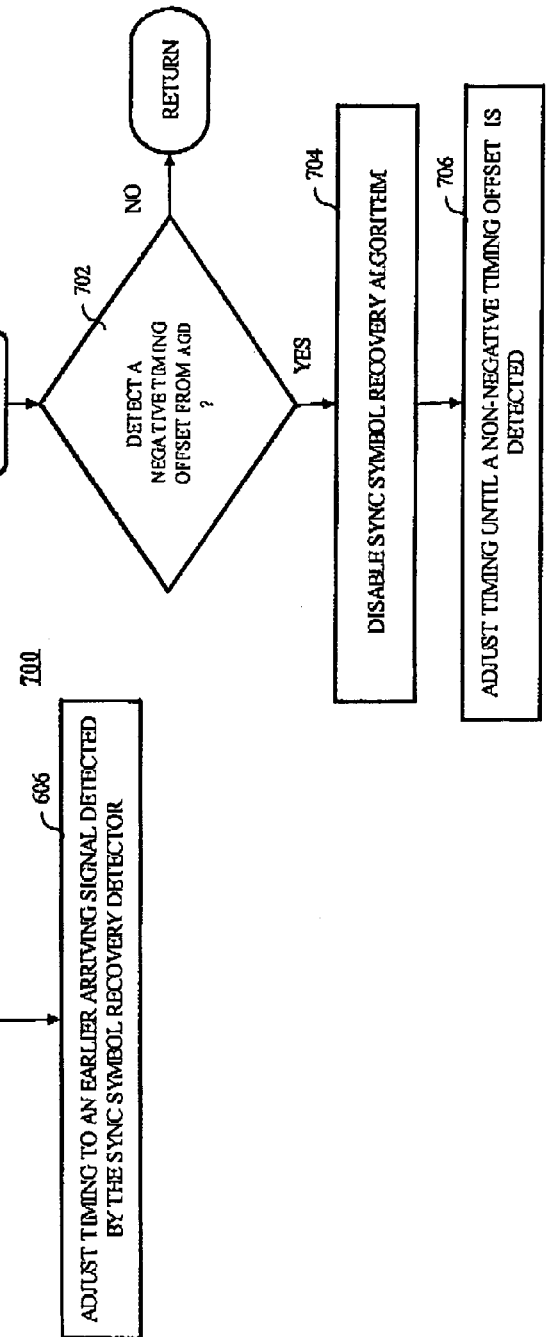
FIG. 7 is a flowchart illustrating another method for avoiding inter-symbol interference in accordance with the present invention.

As will become more clearly apparent with the explanation of FIGS. 6 and 7, a negative phase detection enables the method of timing recovery in accordance with the present invention. In one embodiment as shown in FIG. 6, after detecting a negative phase in an OFDM modulated signal at decision block 602, a search window for a synchronization symbol can be narrowed and the timing to an earlier arriving signal detected by a synchronization symbol recovery detector can be adjusted. In another embodiment as shown in FIG. 7, after detecting a negative phase a synchronization symbol recovery algorithm is diabled and then the phase is adjusted until a non-negative phase is detected.

The description above is intended by way of example only and is not intended to limit the present invention in any way except as set forth in the following claims.

I claim:

1. A method for timing recovery in an orthogonal frequency division multiplexing (OFDM) system, comprising the steps of:
    detecting a lack of a synchronization symbol;
    determining a timing offset from calculating an average Group delay over a set of OFDM symbols by using a phasor to estimate an average delay of a multi-carrier modulation symbol, wherein the determining step uses the phasor to estimate the average delay of the multi-carrier modulation symbol by computing a differential phasor between each pair of adjacent OFDM subcarriers, removing QPSK data by rotating the differential phasor to a first quadrant, and computing an average phasor angle;
    feeding back the timing offset to a demodulator; and
    adjusting a symbol timing based on the Average Group Delay fed back to the demodulator.

2. The method of claim 1, wherein the step of determining the timing offset further comprises the step of determining a phase offset directly from the OFDM symbols using a discriminator in a feedback loop.

3. The method of claim 1, wherein the step of adjusting the symbol comprises the step of adjusting the symbol timing towards a target phase rotation.

4. The method of claim 1, wherein the method further comprises the step of maintaining symbol synchronization without ever detecting the synchronization symbol.

5. The method of claim 1, wherein the angle of the phasor is an estimate of the Average Group Delay and is directly proportional to the timing offset.

6. A digital receiver unit, comprising:
    a receiver;
    an orthogonal frequency division multiplexing demodulator; and
    a processor coupled to the receiver and the demodulator, wherein the processor is programmed to:
        detect a lack of a synchronization symbol;
        determine a phase offset from a set of OFDM symbols using a phasor to estimate an average delay of a multi-carrier modulation symbol by computing a differential phasor between each pair of adjacent OFDM subcarriers, removing QPSK data by rotating the differential phasor to a first quadrant, and computing an average phasor angle;
        feed back the phase offset to the demodulator; and
        adjust a symbol timing based on the phase offset fed back to the demodulator.

7. A digital receiver unit of claim 6, wherein the digital receiver unit further comprises a phase detector coupled to the processor, wherein the phase detector detect the phase offset.

8. The digital receiver unit of claim 6, wherein the processor is further programmed to determine the phase offset directly from the OFDM symbols using a discriminator in a feedback loop.

9. The digital receiver unit of claim 6, wherein the processor is further programmed to adjusting the symbol timing towards a target phase rotation.

10. The digital receiver unit of claim 6, wherein the processor is further programmed to maintain symbol synchronization without ever detecting the synchronization symbol and only using the phase offset.

11. The digital receiver unit of claim 6, wherein the angle of the phasor is an estimate of the Average Group Delay and is directly proportional to the timing offset.

* * * * *